(12) United States Patent
Gustavsson et al.

(10) Patent No.: US 10,218,421 B2
(45) Date of Patent: Feb. 26, 2019

(54) RADIO TRANSMITTER FOR DISTORTION MITIGATION

(71) Applicant: Telefonaktiebolaget LM Ericsson (publ), Stockholm (SE)

(72) Inventors: Ulf Gustavsson, Göteborg (SE); Thomas Eriksson, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 15/518,266

(22) PCT Filed: Nov. 25, 2014

(86) PCT No.: PCT/EP2014/075591
§ 371 (c)(1),
(2) Date: Apr. 11, 2017

(87) PCT Pub. No.: WO2016/082871
PCT Pub. Date: Jun. 2, 2016

(65) Prior Publication Data
US 2018/0241451 A1 Aug. 23, 2018

(51) Int. Cl.
*H04B 7/06* (2006.01)
*H04B 7/0456* (2017.01)
*H01Q 21/24* (2006.01)

(52) U.S. Cl.
CPC ......... *H04B 7/0617* (2013.01); *H04B 7/0456* (2013.01); *H04B 7/0469* (2013.01); *H01Q 21/24* (2013.01)

(58) Field of Classification Search
CPC ........ H01Q 1/246; H01Q 1/523; H01Q 21/08; H04B 1/00; H04B 7/00; H04B 7/06;
(Continued)

(56) References Cited

U.S. PATENT DOCUMENTS

2008/0075058 A1* 3/2008 Mundarath ............ H04B 7/043
370/342
2008/0247489 A1 10/2008 Kou et al.
(Continued)

FOREIGN PATENT DOCUMENTS

EP 2237445 A2 3/2010
WO 2012154090 A1 11/2012
WO 2015188894 A1 12/2015

OTHER PUBLICATIONS

Zeng, Y., et al., "Multiuser Scheduling with Orthogonal Space-Division Multiplexing", 2010 6th International Conference on Wireless Communications Networking and Mobile Computing (WiCOM), Oct. 23-25, 2010, pp. 1-4.
(Continued)

*Primary Examiner* — Shawkat M Ali
(74) *Attorney, Agent, or Firm* — Coats & Bennett, PLLC (57) ABSTRACT

A transmitter for radio transmission to one or more receivers over a channel described at least in part by a channel matrix H, the transmitter comprising a pre-coder connected to an antenna array via a transmit unit, the antenna array comprising a number M of antenna elements $a_m$, $m=1, 2, \ldots, M$, each antenna element am being configured to receive a respective transmit signal component $x_m$ from the pre-coder via the transmit unit, the pre-coder being configured to receive a number K<M of data streams sk, $k=1, 2, \ldots, K$, and to generate the M transmit signal components, wherein the generating comprises adding M shaping components $e_m$, $m=1, 2, \ldots, M$, to respective transmit signal components $x_m$, the shaping components $e_m$ being generated based on a null-space of the channel matrix H and on one or more properties of the transmit unit.

24 Claims, 9 Drawing Sheets

(58) Field of Classification Search
CPC ...... H04B 7/08; H04B 7/0413; H04B 7/0456; H04B 7/0469; H04B 7/063; H04B 7/0617; H04B 7/0837; H04B 17/12; H04L 5/00; H04L 12/26; H04L 27/00; H04L 27/28; H04W 16/28; H04W 52/04; H04W 72/04; H04W 72/046
USPC ........ 370/252, 328, 329, 330, 334; 375/260, 375/262, 267, 295, 316; 455/69, 522, 455/562
See application file for complete search history.

(56) References Cited

U.S. PATENT DOCUMENTS

| | | | |
|---|---|---|---|
| 2010/0195594 A1* | 8/2010 | Seo | H04B 7/0417 370/329 |
| 2011/0274191 A1* | 11/2011 | Lindgren | H04B 7/0417 375/260 |
| 2013/0258972 A1* | 10/2013 | Kim | H04B 7/0617 370/329 |
| 2014/0177751 A1 | 6/2014 | Tomeba et al. | |
| 2014/0192768 A1* | 7/2014 | Yeh | H04B 7/0469 370/330 |
| 2016/0241323 A1* | 8/2016 | Ko | H04B 7/0691 |
| 2017/0244513 A1* | 8/2017 | Pitakdumrongkija | H04B 7/0452 |

OTHER PUBLICATIONS

Nang, R. et al., "MIMO Multiway Relaying with Pairwise Data Exchange: A Degrees of Freedom Perspective", IEEE Transactions on Signal Processing, Oct. 15, 2014, pp. 5294-5307, vol. 62, Issue 20.

Gustavsson, U. et al., "On the Impact of Hardware Impairments on Massive Mimo", Globecom 2014 Workshop—Massive MIMO: From Theory to Practice, Feb. 2014, pp. 294-300.

* cited by examiner

RADIO TRANSMITTER FOR DISTORTION MITIGATION

TECHNICAL FIELD

The present disclosure relates to wireless systems and in particular to a transmitter and method for radio transmission via an antenna array.

BACKGROUND

Very large antenna array systems, such as massive multiple input multiple output (MIMO) systems, provide the opportunity for spatial division multiple access (SDMA) in which each individual user may be served with the same time-frequency resource as other users. This multiple access technique requires accurate and coherent control of both amplitude and phase over the antenna array and is a promising technique with potential to increase spectral efficiency in wireless communication systems.

Massive MIMO is also applicable in radio detection and ranging (RADAR) systems, where it offers potential to increase detection performance of the RADAR system.

Large antenna array systems comprise many antenna elements, and since each antenna element often has dedicated transmit circuitry, comprising, e.g., a digital to analog converter (DAC) and power amplifier (PA), a trade-off is often necessary between the cost of the array in terms of, e.g., power consumption and production cost on one hand, and transmitter performance in terms of, e.g., distortion or efficiency on the other hand.

Consequently, some present antenna arrangements configured for digital beam-forming of a transmit signal are either associated with large cost, or are constrained in terms of spatial duplexing ability due to excessive transmit signal distortion or otherwise limited hardware capabilities.

Thus, at least partly due to the above, there is a need for alternative distortion mitigation methods for use in antenna array systems, allowing for low-cost antenna arrays with spatial duplexing ability.

SUMMARY

An object of the present disclosure is to provide at least a radio transmitter, a radar transceiver, a network node, and methods which seek to mitigate, alleviate, or eliminate one or more of the above-identified deficiencies in the art and disadvantages singly or in any combination and to provide a radio transmitter with improved distortion mitigation.

This object is obtained by a transmitter for radio transmission to one or more receivers over a channel described at least in part by a channel matrix H. The transmitter comprises a pre-coder connected to an antenna array via a transmit unit. The antenna array comprises a number M of antenna elements $a_m$, m=1, 2, ..., M, where each antenna element $a_m$ is configured to receive a respective transmit signal component $x_m$ from the pre-coder via the transmit unit. The pre-coder is configured to receive a number K<M of data streams $s_k$, k=1, 2, ..., K, and to generate the M transmit signal components. The generating here comprises adding M shaping components $e_m$, m=1, 2, ..., M, to respective transmit signal components $x_m$. The shaping components $e_m$ are determined based on a null-space of the channel matrix H and on one or more properties of the transmit unit.

Since the shaping components are determined based on a null-space of the channel matrix H, the shaping components will, in general, not reach the one or more receivers in full, thus allowing for more freedom in the generation of shaping components for improving the performance of the transmitter, or of a transmission system comprising the transmitter.

According to some aspects, the shaping components are generated to reside in the null-space of the channel described at least in part by a channel matrix H and therefore will be blocked or filtered out by the channel.

According to some aspects, by the addition of shaping components to transmit signal components, the distortion perceived by a receiver of the transmitted signal is reduced without increasing the cost of each individual transmitter unit. Thus, an investment in the pre-coder reduces the cost and/or complexity of the transmit unit.

According to some further aspects, by the addition of shaping components to the transmit signal components, the transmit signal is optimized for the specific properties of a given transmit unit. Hence, by taking the one or more properties of the transmit unit into account in the generating, a transmit signal tailored for a given antenna array is obtained, allowing for improved optimization of the transmitter. The performance of the transmitter is hereby improved without increasing the overall cost of the transmit unit significantly.

There is also disclosed herein a network node, and a radar transceiver, comprising the radio transmitter discussed above.

The object is furthermore obtained by a method for radio transmission to one or more receivers over a channel described at least in part by a channel matrix H. The method is performed in a transmitter comprising a transmit unit connected to an antenna array having a number M of antenna elements $a_m$, m=1, 2, ..., M. The method comprises receiving a number K<M of data streams $s_k$, k=1, 2, ..., K, and determining M shaping components $e_m$ based on a null-space of the channel matrix H and on one or more properties of the transmit unit. The method also comprises generating M transmit signal components $x_m$ from the K data streams. The generating comprises adding the M shaping components $e_m$, to respective transmit signal components $x_m$. The method also comprises transmitting the M transmit signal components $x_m$ from respective antenna elements $a_m$.

In addition to the above method, there is also provided herein computer programs comprising computer program code which, when executed in a radio transmitter, in a network node, or in a radar transceiver, causes the radio transmitter, network node, or radar transceiver, respectively, to execute methods according to the present teaching.

The computer programs, the methods, the network node, and the radar transceiver, display advantages corresponding to the advantages already described in relation to the radio transmitter.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

The present teaching relates to mitigating transmit signal impairment and distortion experienced by one or more receivers in wireless systems using antenna arrays for transmission of wireless signals, such as the large antenna arrays used in massive multiple-input multiple-output (MIMO) systems. The techniques disclosed herein are applicable in a wide variety of areas, including wireless communication as well as in radar and positioning systems. The transmitting arrangement may be distanced from the receiving arrangement, as in the communication system discussed in connection to FIG. 1*a* below, or co-located with the receiving arrangement, as in the radar system discussed in connection to FIG. 1*b* below. Furthermore, the different components and functions of the transmitter disclosed herein may be co-located or spatially separated, i.e., any given function may be distanced from the actual geographic point of transmission of radio signals. For instance, computation may be performed by a computation node distanced from the geographic point if transmission.

Herein, mitigating transmit signal distortion is to be construed as mitigating the distortion experienced by a receiver of the transmitted signal, i.e., after the transmitted signal has propagated from transmitter to receiver via a wireless channel. Thus, transmit signal components transmitted from individual antenna elements in an antenna array are not necessarily of low distortion. On the contrary, they are in some cases likely to be heavily distorted, but this distortion is mitigated when transmit signal components combines at a receiver.

Transmit signal distortion, interference, and unwanted signal emissions, such as out-of-band emission, may be averaged not only over time and frequency, but also over space due to the spatial selectivity of beam-forming antenna arrays. The present teaching, according to some aspects, makes use of the "massiveness", i.e., the large number of degrees of freedom, of advanced large antenna arrays in order to reduce the overall power consumption and/or cost of the antenna arrangement and still deliver a high fidelity radio function with low error vector magnitude, EVM, in receivers such as user equipment, UE, radar transceivers, or other wireless devices. This is made possible by the addition of a shaping signal which, when added to transmit signal components, improve on the averaging effect that invariably occurs when a signal transmitted from a large antenna array arrives at a receiver.

Aspects of the present disclosure also relates to the adding of a shaping signal to the transmitted signal, which shaping signal simplifies or facilitates efficient transmission of transmit signal components. The shaping components are thus used to improve on the performance or efficiency of a transmitter. Since the shaping signal is generated based on a null-space of the propagation channel, the addition of the shaping signal is, according to some aspects, essentially invisible to a receiver of the transmitted signal. This is because signals transmitted in or near, in a Euclidean sense, the channel null-space are heavily suppressed, and do not reach the receiver or receivers.

Aspects of the present disclosure will now be described more fully with reference to the accompanying drawings. The devices, computer programs and methods disclosed herein can, however, be realized in many different forms and should not be construed as being limited to the aspects set forth herein. Like numbers in the drawings refer to like elements throughout.

Figure 1A:
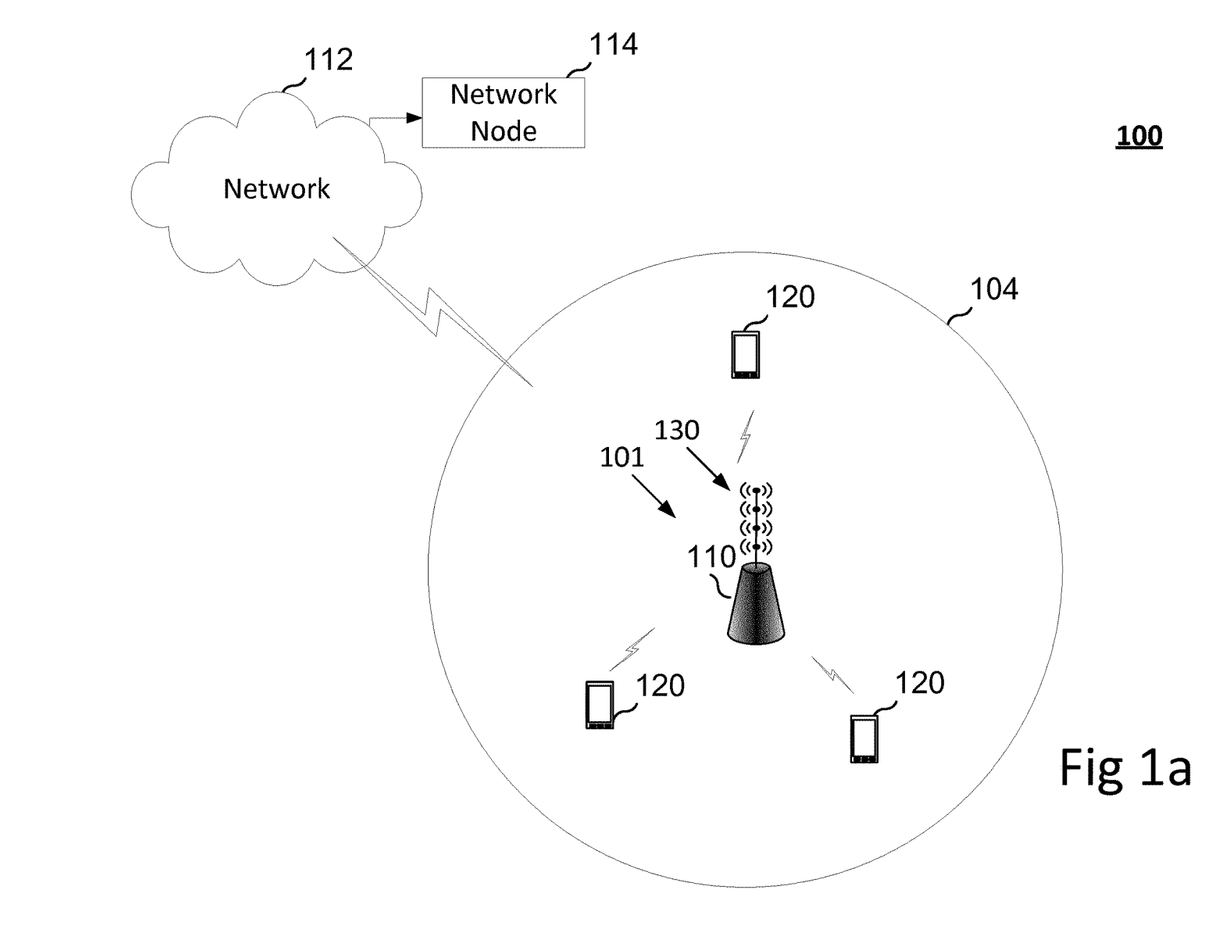
FIG. 1a is a schematic overview of a radio access network.

FIG. 1*a* illustrates aspects of a wireless communication system 100, which includes wireless devices 120 in communication with a network node 101. The network node provides coverage for cell 104. The network node 101, or base station, is in communication with a control node, i.e., another network node 114, via a network 112. The network node 114 may be any network node such as a Radio Network Controller (RNC), a Mobility Management Entity (MME), a Mobile Switching Center (MSC), or Base Station Subsystem (BSS). The network node 101 or base station, according to aspects, operates using space division multiple access (SDMA), where, if the distance between the wireless devices 120 is more than a minimum distance, the base station may reuse the same time-frequency resource for more than one wireless device.

The wireless device discussed herein can be any type of wireless device capable of communicating with a network node or another wireless device using radio signals. The wireless device may also be a radio communication device, target device, device to device (D2D) user equipment (UE), machine type UE or UE capable of machine to machine communication (M2M), a sensor equipped with UE, iPad, tablet, mobile terminal, smart phone, laptop embedded equipped (LEE), laptop mounted equipment (LME), USB dongles, Customer Premises Equipment (CPE) etc.

Generic terminology such as "radio network node" or simply "network node" is occasionally used herein. The network node can be any kind of network node which may comprise a base station, radio base station, base transceiver station, base station controller, network controller, evolved Node B, eNB, Node B, relay node, access point, radio access point, Remote Radio Unit (RRU), Remote Radio Head (RRH), etc.

The various aspects herein are at times described using LTE concepts. However, the aspects are applicable to any radio access technology (RAT), or multi-RAT system, e.g., LTE FDD/TDD, WCDMA/HSPA, GSM/GERAN, Wi Fi, CDMA2000 etc.

Figure 1B:
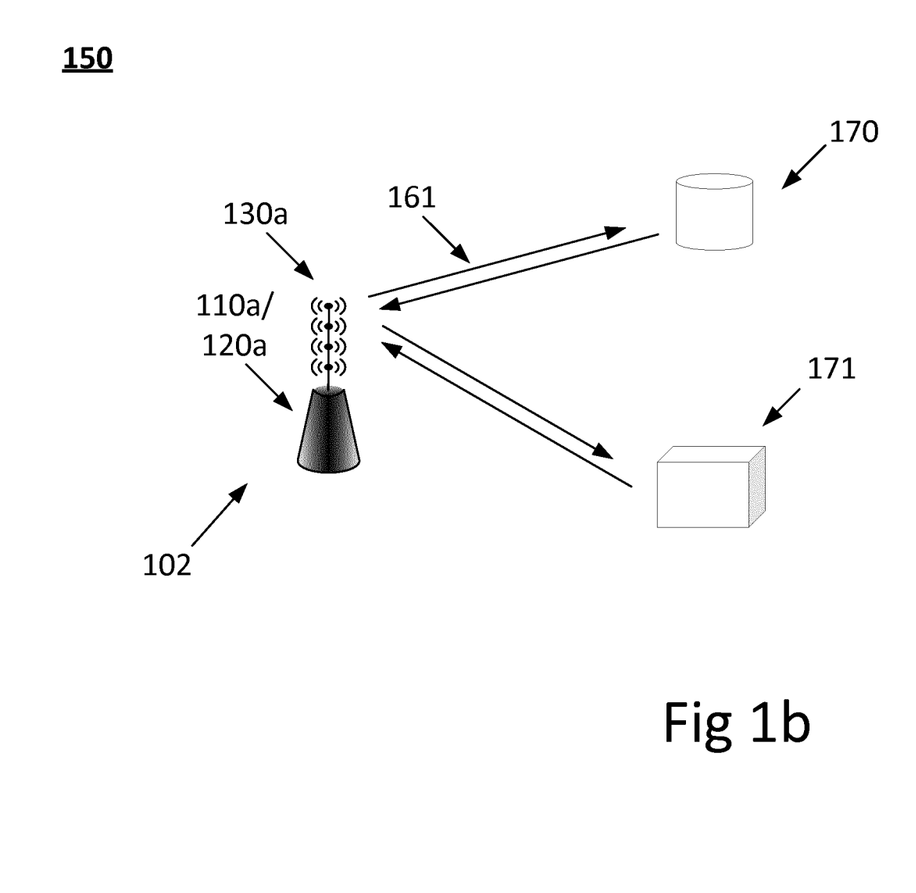
FIG. 1b is a schematic overview of a radar system.

FIG. 1*b* illustrates a radar system 150 in which some aspects of the present teaching are applicable. Here, a radar transceiver comprising the transmitter of the present teaching emits and receives wireless signals 161 using an antenna arrangement 130*a*. The wireless signals are reflected by a number of targets 170, 171.

Figure 2:
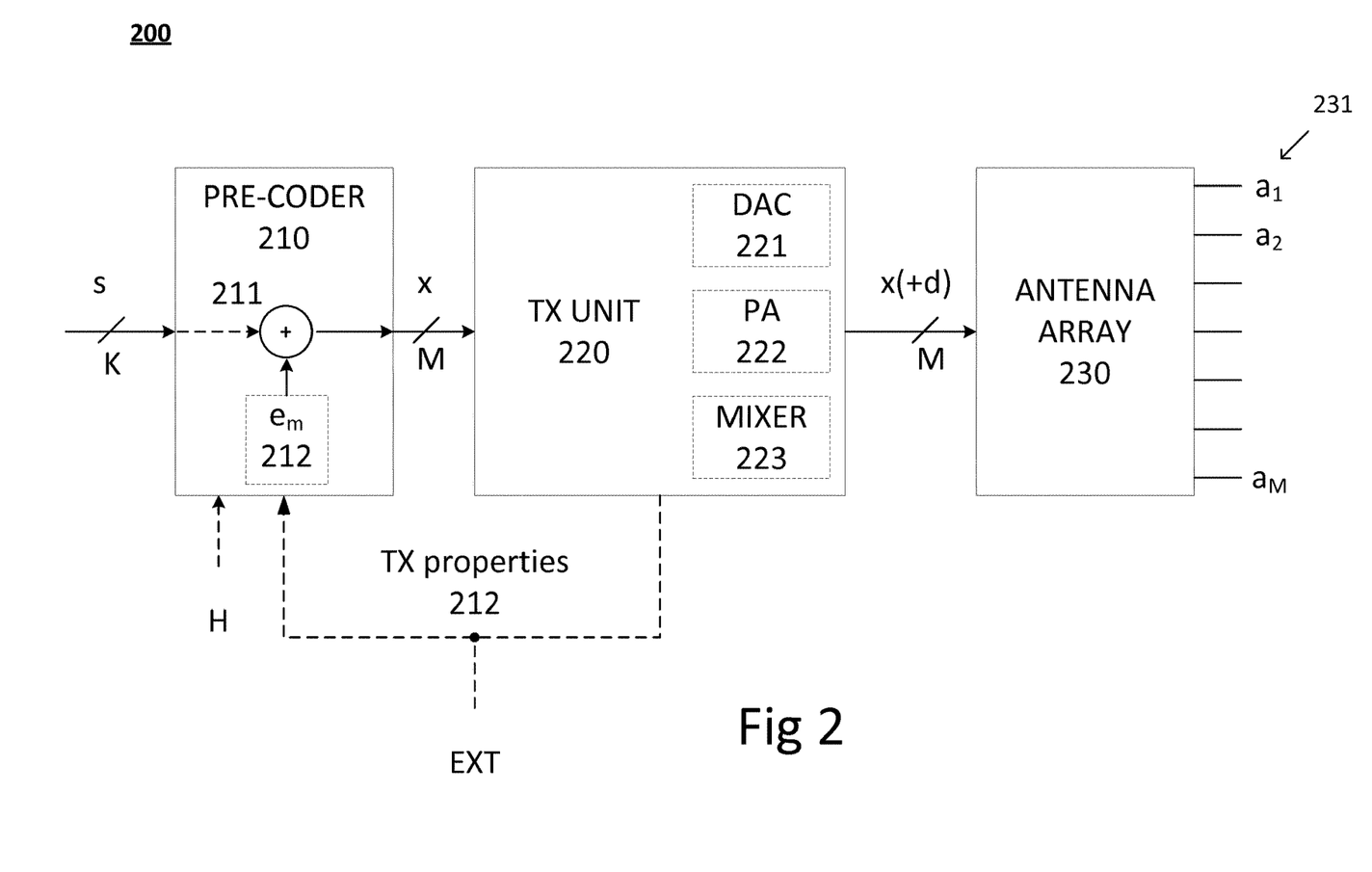
FIGS. 2-4 are block diagrams illustrating radio transmitters according to some of the aspects presented herein.

FIG. 2 is a block diagram illustrating radio transmitters 200 according to some of the aspects presented herein. In particular, FIG. 2 illustrates a transmitter 200 for radio transmission to one or more receivers 120, 120*a*, over a channel described at least in part by a channel matrix H. The transmitter comprises a pre-coder 210 connected to an antenna array 230 via a transmit unit 220. The antenna array 230 comprises a number M of antenna elements $a_m$ 231, m=1, 2, ..., M. Each antenna element $a_m$ is configured to receive a respective transmit signal component $x_m$ from the pre-coder 210 via the transmit unit 220. The pre-coder is configured to receive a number K<M of data streams $s_k$, k=1, 2, ..., K, and to generate the M transmit signal components. The generating here comprises adding M shaping components $e_m$, m=1, 2, ..., M, to respective transmit signal components $x_m$, the shaping components $e_m$ being determined based on a null-space of the channel matrix H and on one or more properties of the transmit unit 220.

FIG. 2 illustrates signals passing between blocks by vectors s, x, and x(+d). It is appreciated that these vectors comprise the components mentioned above, i.e., the vector s comprises the number K<M of data streams $s_k$, k=1, 2, ..., K, the vector x comprises the transmit signal components $x_m$, m=1, 2, ..., M. Vector x(+d), according to some aspects, comprises the transmit signal components $x_m$, m=1, 2, ..., M in addition to M distortion components $d_m$. The distortion components are not present according to all aspects of the disclosure and are therefore indicated in parenthesis.

It is generally noted that the various signals discussed herein at times are referred to as components, signals, or vectors. Thus, shaping signal, shaping component, and shaping vector are to be construed as the same type of signal having the same function. Also, transmit signal, transmit signal components, and transmit vector also denote the same type of signal having the same function.

The one-to-one mapping between transmit signal components and antenna elements will be maintained throughout the present disclosure. Thus, each antenna element is configured to receive one respective transmit signal component, and no transmit signal component is fed to more than one respective antenna element.

Furthermore, a pre-coder is herein a unit or module in an antenna arrangement which processes a number K of input data streams and maps the processed result to a number M of antenna elements. The purpose of the pre-coder is, according to some aspects, to beam-form different components of the transmit signal vector to match the location of a number of corresponding receivers or targets. According to some aspects the pre-coder comprises additional functionality, such as channel coding and pilot insertion.

The pre-coder 210 illustrated in FIG. 2 is further arranged to receive information related to the channel matrix H, which information according to aspects comprises an estimate of the channel matrix H, or a description of the null-space of channel matrix H.

A part of the proposed solution is to utilize knowledge of the channel matrix H in order to enforce cancellation of the per-antenna applied shaping components. This enables, e.g., the use of low-resolution data-converters in a down-link of a communication system, while keeping the impact on error vector magnitude (EVM) from the shaping components low.

In this way, a dithering sequence, which is one type of shaping component comprising a random signal intended to de-correlate parts of the transmit signal components, applied to the transmit components will, due to the shaping components $e_m$ being determined based on a null-space of the channel matrix H, cancel out at a receiver, even for smaller arrays, leaving no or little residual dithering noise which otherwise may potentially impact the received EVM in a negative manner.

The pre-coder 210 illustrated in FIG. 2 is furthermore arranged to receive information 212 about the one or more properties of the transmit unit 220. This information, according to some aspects, is arranged to be received from the transmit unit 220. According to some other aspects, the pre-coder is configured to receive information regarding the one or more properties of the transmit unit 220 from an external source, EXT, such as a memory, a database, or from manual configuration of the pre-coder 210.

FIG. 2 also shows a determining module 212 configured to determine the shaping components $e_m$ based on a null-space of the channel matrix H and on one or more properties of the transmit unit 220. Thus, according to some aspects, the pre-coder 210 comprises said determining module 212.

The addition of shaping components $e_m$ to transmit signal components $x_m$ is illustrated in FIG. 2 by a shaping component processing unit 211 taking the shaping $e_m$ components as input. Thus, according to some aspects, the pre-coder 210 comprises said shaping component processing unit 211.

In order to provide a better understanding of the effects and consequences of adding the shaping sequence to the transmit signal components; we now study a model y of the received signal vector, assuming a channel matrix H. The channel matrix H here has one column for each receiver, each such column modelling the channel between the transmitter antenna array and the single antenna of the receiver. A similar model would be applicable in a MIMO setting where receivers have more than one antenna.

The received vector y, according to a modelled transmission of transmit signal components in a vector x, after propagation via the channel H, is described by $$y=H^Hx+n$$

where $H \in C^{M \times K}$ is the channel-matrix, $y \in C^{K \times 1}$ is the received signal-vector, $x \in C^{M \times 1}$ is the transmit data-vector comprising the transmit signal components $x_m$, and $n \in C^{K \times 1}$ is receiver noise. In case the number of receiver antennas K is smaller than the number of antennas M, we know that even for full rank of H, the dimensionality of its null-space is large $$\dim(\mathrm{null}(H))=M-K>>0$$

A large null-space implies a large space in which we may conceal undesired hardware artifacts such as quantization noise, dithering, or shaping sequences for increased transmitter performance. It is exactly this effect that is exploited in aspects of the present technique.

Now, if we add a shaping vector or dithering vector E to the transmit signal components prior to transmission by the transmit unit, we have $$y=H^H(x+\varepsilon)+n$$

When the dithering vector ε resides in the null-space of $H^H$ ($H^H\varepsilon=0$), we are brought back to the desired received signal when the transmitted signal components combine at the one or more receivers.

$$y=H^Hx+H^H\varepsilon+n=H^Hx+n$$

If we assume an asymptotically large number of antennas, i.e., if M becomes large, and if E is generated from a zero mean process, independently distributed over the M antennas, we note that $$H^H\varepsilon \to 0$$

when M tend to infinity. For finite M, we will not reach perfect cancellation, but if M is high we can still achieve good performance.

Some of the techniques proposed herein are suitable for arbitrarily values of M. We first find a shaping vector according to some technique, e.g., as a vector of independent elements having a uniform distribution, and then we project the vector onto the null-space of the channel matrix H. This gives us the received vector $$y=H^H(x+P_H^\perp\varepsilon)+n$$

where $P_H^\perp$ is the orthogonal projection matrix which projects any vector onto the null-space of H. This matrix is computed as $$P_H^\perp=I-H(H^HH)^{-1}H^H$$

We consider two not necessarily separate cases, one where the added shaping vector has an impact on a distortion added to the transmit signal components by the transmit unit, and one case where the shaping sequence has an effect on a performance metric of the transmit unit;

Thus, according to some aspects, the one or more properties of the transmit unit 220 comprises addition of unwanted distortion components $d_m$ to respective transmit signal components $x_m$, the distortion components $d_m$ being dependent on shaping components $e_m$ of corresponding transmit signal components $x_m$.

According to some other aspects, a performance metric of the transmit unit 220 is dependent on one or more characteristics of the transmit signal components $x_m$, the respective shaping components $e_m$ then has an impact on said characteristics of the transmit signal components $x_m$.

The transmit unit 220 shown in FIG. 2, according to different aspects, comprises any of a digital to analog converter, DAC, 221, a power amplifier, PA, 222, and a mixer 223. Furthermore, the properties of these components contribute to the one or more properties of the transmit unit 220. For instance, the non-linear distortion inflicted by the PAs contribute significantly to the non-linear distortion inflicted on the transmit signal components by the overall transmit unit 220*a*.

Further examples of the distortion components $d_m$, according to different aspects, comprises non-linear distortion introduced by other non-linear components in the transmit unit 220, such as mixers, DACs, etc. Other examples of said distortion components, according to aspects, comprises additive noise and phase noise introduced by components such as mixers 223 comprised in the transmit unit 220. The distortion components, according to aspects, also comprise white noise.

Examples of the above-mentioned performance metrics, according to different aspects, include efficiency of the PAs, linearity of the PAs, and power efficiency of the complete transmit unit 220. Further example performance metrics include power consumption and/or heat dissipation of individual components in the transmit unit 220, or of the complete transmit unit 220.

Since the shaping components $e_m$ have an impact on the statistical characteristics of the transmit signal components $x_m$, which in turn influences the performance metric or metrics of the transmit unit 220, the shaping components can be used to improve on the performance metric or metrics of the transmit unit 220. Examples include determining suitable shaping sequences by computer simulation, or by experimentation in lab that produce transmit signal components which yield higher performance after addition of the shaping components than before addition of the shaping components.

According to some aspects, the power efficiency of a PA depends on or can be designed to depend on the variance or probability density function of the transmit signal components. A shaping sequence which minimizes or reduces the variance of the transmit signal components after addition will then have an advantageous effect on the power efficiency of the PA. If, in addition, the shaping sequence is generated in or near the null-space of the channel matrix H, then the addition of the shaping sequence will not be directly visible at a receiver of the transmitted signal.

According to some other aspects, the non-linearity of the PA depends on the peak-to-average power ratio (PAPR) of the transmit signal components. A shaping sequence in or near the null-space of H which also minimizes the PAPR of the transmit signal components can be used in order to improve the performance of the transmitter 200 in terms of power efficiency and non-linearity. Here, near is to be construed in a geometrical or Euclidean sense, measured, e.g., by a suitable vector norm.

Figure 3:
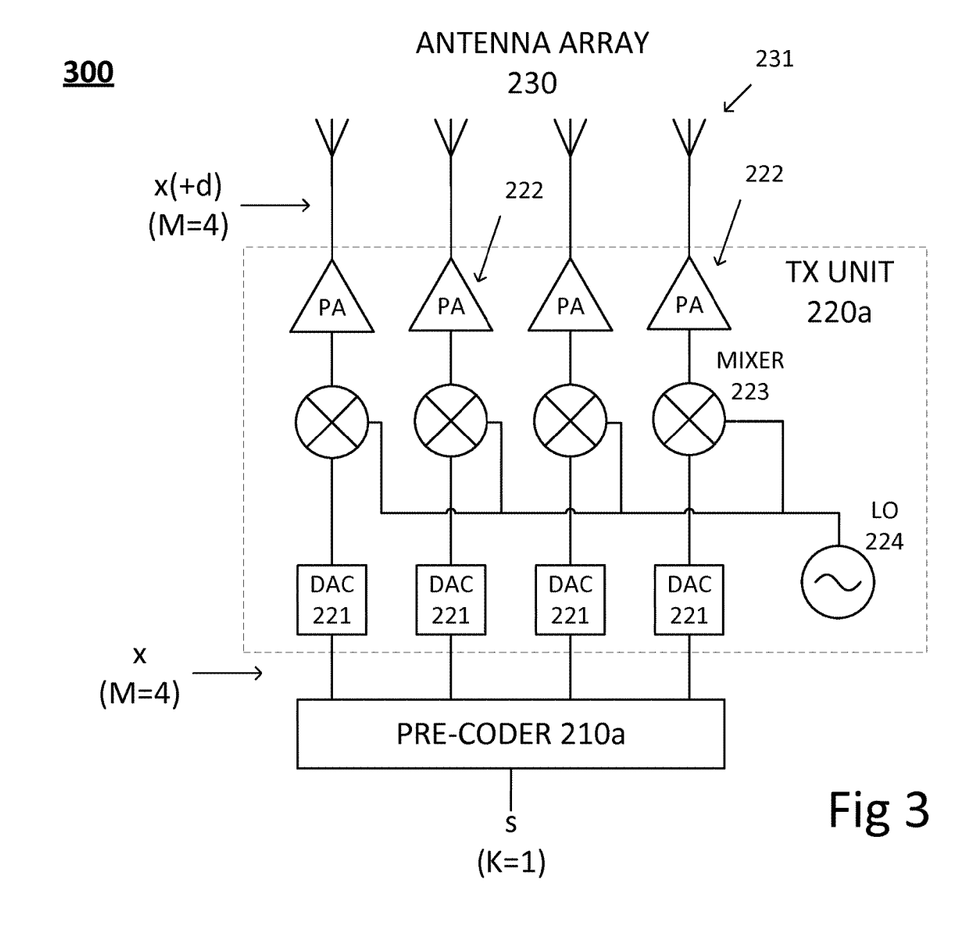

FIG. 3 is a block diagram illustrating a radio transmitter 300 according to some of the aspects presented herein. In particular, FIG. 3 illustrates details of a transmit unit 220*a* according to the disclosure.

The output from the pre-coder 210*a* is here converted into analog signals by a number of digital-to-analog converters (DACs) 221 before being translated to radio frequency (RF) by mixers 223 driven by a local oscillator (LO) 224. Finally, transmit signal components are amplified by a number of power amplifiers (PA) 222 before being transmitted from the antenna elements 231.

As already noted above, most transmit unit components, such as the DACs 221 and the PAs 222, add distortion or different types of impairment on to the transmit signal components. The DACs often add quantization noise, while the PAs add non-linear distortion. We will refer to this distortion by the common symbol $d_m$.

The effect of quantization noise due to the DACs experienced by a receiver can be alleviated by adding shaping components in the form of dithering sequences to respective transmit signal components. That is, suppose the transmitted signal vector is TX=s+e, where s is the payload signal vector and e is an error vector dominated by DAC artifacts due to the reduced DAC resolution, wherein the number of elements in s and e correspond to the number of antenna elements. Suppose further that a transmission channel between the antenna arrangement 500 and a receiver of the beam-formed transmit signal TX can be modelled by channel matrix H. The received signal is then essentially given by y=H(s+e)+w=Hs+He+w, where w is distortion vector added at the receiver, such as receiver noise.

Now, for a large antenna array, the length of vector e, i.e., the number of elements in vector e, is significantly larger than the length of vector y, i.e., the number of elements in vector y. Thus, when matrix H multiplies vector e, a weighted summation of the elements in e occurs. Consequently, if the elements of e are uncorrelated and zero mean, the power of the term He will be small, i.e., a beneficial effect is obtained from averaging over vector e as long as the elements in vector e are uncorrelated and have zero mean. The dithering sequences provide this beneficial feature in that they transform the elements of the error vector to be more uncorrelated and have mean closer to zero.

Consequently, according to aspects, the transmit unit 220 comprises one or more digital to analog converters 221 (DACs). The distortion components $d_m$ added to the transmit signal components by the transmit unit 220, 220*a* comprises quantization errors due to said DACs 221, 221*a*. The shaping components $e_m$ comprises independent dithering components determined based on a least significant bit, LSB, signal magnitude of the one or more DACs 221, 221*a*.

According to some aspects, the dithering components constitute a vector of independent identically distributed elements, statistically distributed essentially between −LSB/2 and LSB/2, and projected onto the null-space of the channel matrix H.

According to further aspects, the performance metric of the transmit unit 220, 220*a* comprises a power efficiency of a power amplifier 222 comprised in the transmit unit 220, 220*a*, and the one or more characteristics of the transmit signal components $x_m$ comprises a signal variance of the transmit signal components $x_m$.

Thus, since the shaping components influence the transmit signal components, which in turn impact the power efficiency of one or more PAs 222 of the transmit unit, the shaping components can be used to improve on the power efficiency by choosing a shaping component sequence which reduces signal variance of the transmit signal components. Such a shaping sequence can be found by computer simulation, by lab experimentation, or by mathematical methods.

According to some aspects, the performance metric comprises a measure of non-linear distortion on the transmit signal components $x_m$ by the transmit unit 220, 220a, and the one or more characteristics of the transmit signal components $x_m$ comprises a peak-to-average power ratio, PAPR, or a cubic metric, of the transmit signal components $x_m$.

Thus, similar to improving power efficiency of the transmit unit discussed above, the shaping components are according to aspects used to reduce the PAPR or cubic metric of the transmit signal components, which in turn leads to improvements in the linearity properties of the transmit unit 220, 220a.

According to some aspects, the performance metric comprises a dynamic range of the transmit unit 220, 220a, or of a component comprised in the transmit unit, and the one or more characteristics of the transmit signal components $x_m$ comprises a peak amplitude of the transmit signal components $x_m$.

Again, the shaping components is according to aspects used to suppress the peak amplitude of the transmit signal components, whereupon the perceived dynamic range of the transmit unit is improved.

Figure 4:
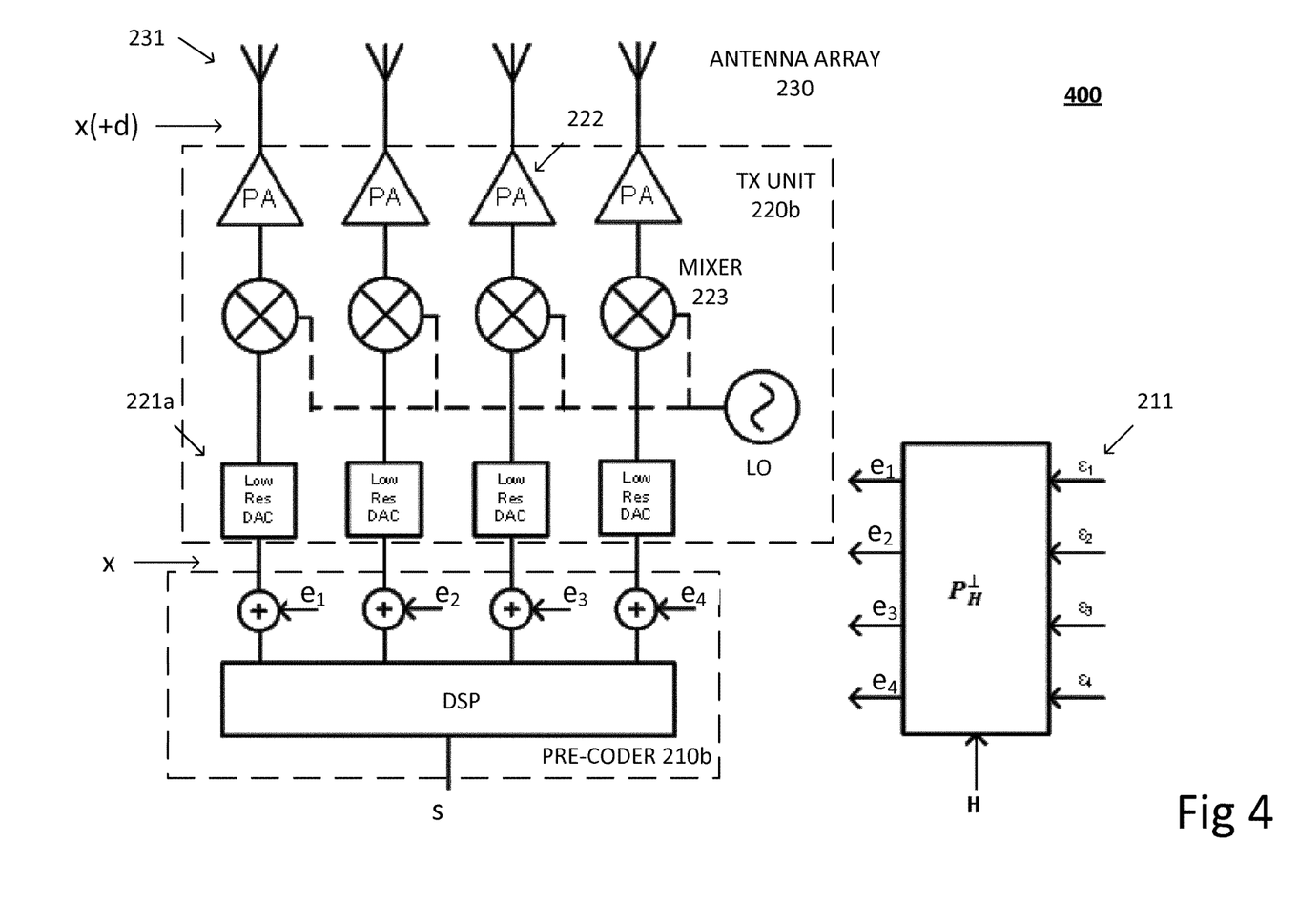

FIG. 4 is a block diagram illustrating a radio transmitter 400 according to some of the aspects presented herein.

High speed, high resolution DACs, used in many antenna arrays tend to consume a significant amount of power. For some example DAC circuits, every added bit, i.e., increase in DAC resolution, doubles the chip-area and the power consumption of the DAC. State-of-the-art high speed and high resolution DACs capable of running at high bandwidths usually consume power in the range of 1-2 Watts, which, when multiplied by the number of antenna elements in a large antenna arrangement, can result in a power consumption on the order of several hundreds of Watt's.

This power consumption is likely to cause problems as antenna arrays grow in number of elements. One advantageous effect of the present technique is a reduction in power consumption obtained from the use of reduced resolution, or low resolution, DACs.

FIG. 4 illustrates a transmitter 400 where the transmit unit 220b comprises low resolution DACs 221a. Such DACs are likely to introduce significant quantization noise in the transmit signal components prior to transmission from antenna elements. However, this quantization noise will be averaged at a receiver of the transmitted signal, due to the combination of transmit signal components which will occur at the receiver antenna. Furthermore, this averaging effect will be enhanced by the addition of shaping components $e_1, \ldots, e_4$, as illustrated in FIG. 4 and discussed above.

According to aspects, the shaping components $e_m$ are determined by projection of a shaping vector $\varepsilon$ 211 onto the null-space of the channel matrix H.

According to aspects, the projection comprises multiplication by an orthogonal projection matrix $P_H^\perp = I - H(H^H H)^{-1} H^H$, where I denotes the identity matrix, $(\cdot)^{-1}$ denotes matrix inverse, and $H^H$ denotes Hermitian transpose of the channel matrix H.

The shaping vector, according to some aspects, comprises un-correlated uniformly distributed components.

The shaping vector is, according to some other aspects, formed by generating a uniformly distributed zero-mean pseudo-noise (PN) sequence. As depicted, channel state information, i.e., the channel matrix H, is fed to the projection process in order to compute the projection matrix $P_H^\perp$.

According to some aspects, the shaping vector is uniformly distributed over an interval corresponding to $-LSB/2$ to $LSB/2$, where LSB denotes a signal amplitude corresponding to the least significant bit of one or more DACs comprised in the transmit unit.

According to some aspects, the shaping vector is distributed according to a normal distribution with zero mean and a pre-determined standard deviation substantially equaling $LSB/2$, where LSB denotes a signal amplitude corresponding to the least significant bit of one or more DACs comprised in the transmit unit.

According to some aspects, the shaping vector comprises a pseudo-noise, PN, sequence.

According to some aspects, the shaping vector comprises an additive white Gaussian noise, AWGN, sequence.

According to some aspects, the shaping vector comprises one out of a number of pre-determined periodic sequences stored in a memory device of the transmitter 400.

Turning again to FIG. 1a, there is, in addition to the transmitters described in connection to FIGS. 2-4 above, also disclosed herein a network node 101 comprising the transmitter 110, 200, 300, 400.

Turning again to FIG. 1b, there is, in addition to the transmitters described in connection to FIGS. 2-4 above, also disclosed herein a radar transceiver 102 comprising the transmitter 110, 200, 300, 400.

It is noted that FIGS. 3 and 4 illustrate the case of a 4-dimensional antenna array, i.e., an antenna array where M=4, but the concept is readily extendable to an arbitrary number M>1 of antenna elements.

Figure 5:
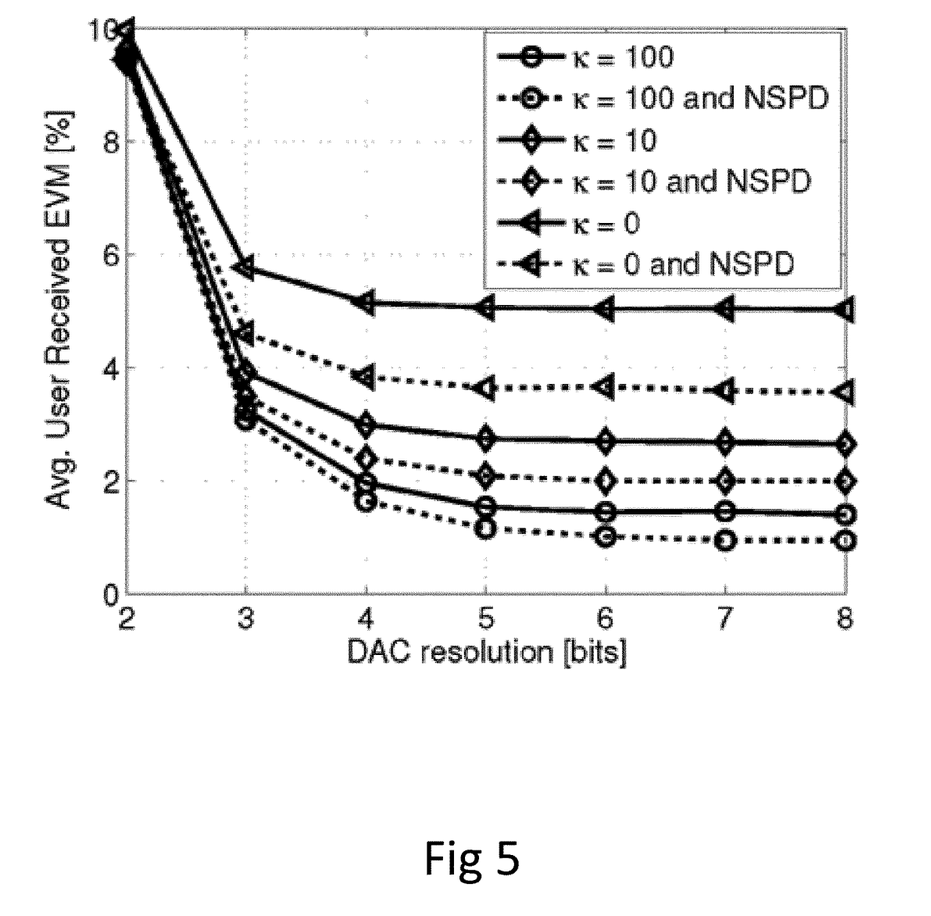
FIG. 5 is a graph of error vector magnitude vs. DAC resolution in bits.

FIG. 5 is a graph of error vector magnitude vs. DAC resolution in bits.

FIG. 5 shows simulated performance in terms of average user received EVM for different transmit DAC resolutions, with and without the null-space projection (NSPD denoting use of the null-space projection technique discussed above). Here, kappa indicates a measure of multipath vs. line of sight signal strength in the propagation channel.

The simulation results illustrates the advantage of the shaping components $e_m$ being determined based on a null-space of the channel matrix H and on one or more properties of the transmit unit 220. Particularly for a small number of antennas M, the performance gains are substantial compared to a system not determining shaping components based on a null-space of the channel matrix H.

Figure 6:
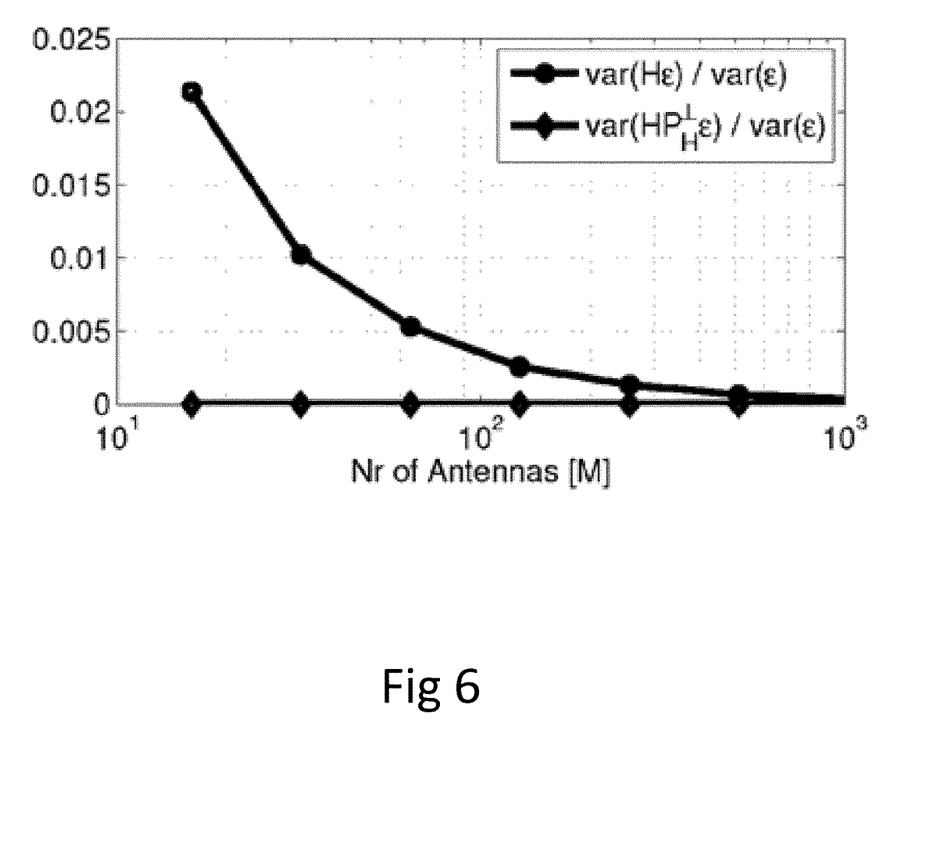
FIG. 6 is a graph of normalized signal variance vs. number of antenna elements.

FIG. 6 is a graph of normalized signal variance vs. number of antenna elements. FIG. 6 illustrates convergence rate in terms of variance of the spatially filtered shaping vector $H^H \varepsilon$ for both the conventional, uniformly distributed dither as well as the null-space projected dither.

Observe that the null-space projection forces the dithering to cancel out even for much smaller arrays, which allows us to spatially de-correlate the quantization noise from the transmit signal and increase the effective resolution at each user.

Figure 7:
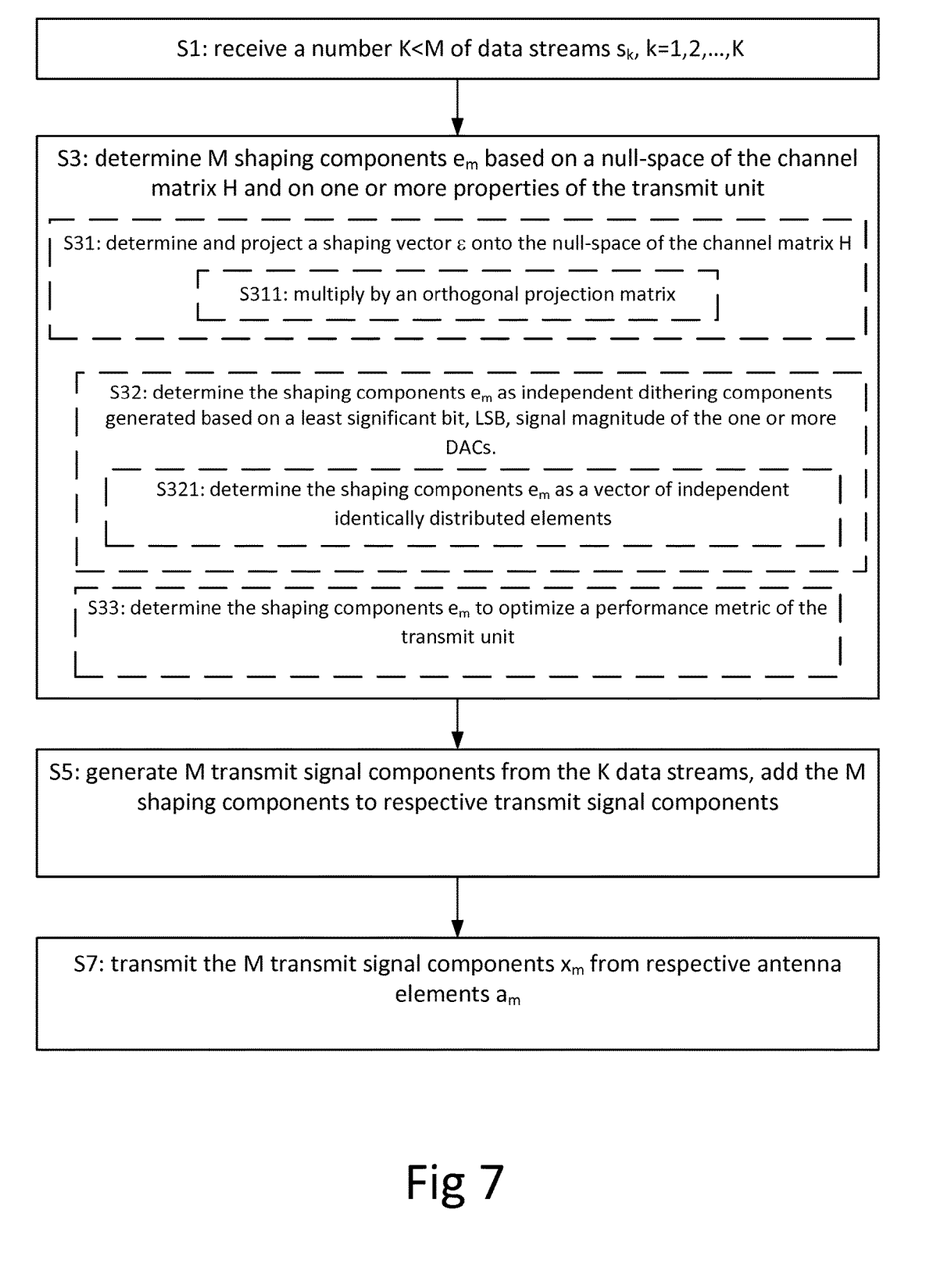
FIG. 7 is a flowchart illustrating methods in a transmitter according to some of the aspects presented herein.

FIG. 7 is a flowchart illustrating methods in a transmitter according to some of the aspects presented herein. Aspects of the disclosed methods can be implemented in the transmitters described above. However, the methods disclosed herein need not necessarily be implemented in the hardware described in connection to FIGS. 1-4 above. The methods are associated with the same advantages and technical effects already discussed in relation to the transmitters above.

In particular, there is illustrated in FIG. 7 a method for radio transmission to one or more receivers 120, 120a over a channel described at least in part by a channel matrix H. The method is performed in a transmitter 110, 110a, 200, 300, 400 comprising a transmit unit 220, 220a, 220b connected to an antenna array 130, 130a, 230 having a number M of antenna elements $a_m$ 231, m=1, 2, ..., M. The method comprises receiving S1 a number K<M of data streams $s_k$, k=1, 2, ..., K, and determining S3 M shaping components $e_m$ based on a null-space of the channel matrix H and on one or more properties of the transmit unit 220, 220a, 220b. The method also comprises generating S5 M transmit signal components $x_m$ from the K data streams. The generating here comprises adding the M shaping components $e_m$ to respective transmit signal components $x_m$. The method also comprises transmitting S7 the M transmit signal components $x_m$ from respective antenna elements $a_m$ 231.

Again, since the shaping components are determined based on a null-space of the channel matrix H, the shaping components will, in general, not reach the one or more receivers in full, thus allowing for more freedom in the generation of shaping components for improving the performance of the transmitter, or of a transmission system comprising the transmitter.

A part of the proposed solution is thus to utilize knowledge of the channel matrix H in order to enforce cancellation of the per-antenna applied shaping components. This enables, e.g., the use of low-resolution data-converters in a down-link of a communication system, while keeping the impact on error vector magnitude (EVM) from the shaping components low.

In this way, a dithering sequence, which is one type of shaping component comprising a random signal intended to de-correlate parts of the transmit signal components, applied to the transmit components will, due to the shaping components $e_m$ being determined based on a null-space of the channel matrix H, cancel out at a receiver, even for smaller arrays, leaving no or little residual dithering noise which otherwise may potentially impact the received EVM in a negative manner.

According to aspects, the determining S3 comprises determining and projecting the shaping components $e_m$ by projecting S31 a shaping vectors 211 onto the null-space of the channel matrix H.

According to aspects, the projecting S31 comprises multiplying S311 by an orthogonal projection matrix $P_H^\perp = I - H(H^H H)^{-1} H^H$, where I denotes the identity matrix, $(\cdot)^{-1}$ denotes matrix inverse, and $H^H$ denotes Hermitian transpose of the channel matrix H.

According to aspects, the one or more properties of the transmit unit 220, 220a, 220b comprises addition of distortion components $d_m$ to respective transmit signal components $x_m$, the distortion components $d_m$ being dependent on the shaping components $e_m$ of corresponding transmit signal components $x_m$.

According to aspects, the transmit unit 220, 220a, 220b comprises one or more digital to analog converters 221, 221a, DACs, the distortion components $d_m$ comprising quantization errors due to said DACs 221, 221a. The determining S3 comprises determining S32 the shaping components $e_m$ as independent dithering components generated based on a least significant bit, LSB, signal magnitude of the one or more DACs 221, 221a.

According to aspects, the determining S32 comprising determining S321 the shaping components $e_m$ as a vector of independent identically distributed elements, statistically distributed essentially between −LSB/2 and LSB/2, and projected onto the null-space of the channel matrix H.

According to aspects, a performance metric of the transmit unit 220, 220a, 220b is dependent on one or more characteristics of the transmit signal components $x_m$, the respective shaping components $e_m$ having an impact on said characteristics of the transmit signal components $x_m$.

According to aspects, the performance metric of the transmit unit 220, 220a, 220b comprises a power efficiency of a power amplifier 222 comprised in the transmit unit 220, 220a, 220b. The one or more characteristics of the transmit signal components $x_m$ comprising a signal variance of the transmit signal components $x_m$.

According to aspects, the performance metric comprises a measure of non-linear distortion on the transmit signal components $x_m$ by the transmit unit 220, 220a, 220b, and the one or more characteristics of the transmit signal components $x_m$ comprises a peak-to-average power ratio, PAPR, or a cubic metric, of the transmit signal components $x_m$.

According to aspects, the performance metric comprises a dynamic range of the transmit unit 220, 220a, 220b, or of a component comprised in the transmit unit, and the one or more characteristics of the transmit signal components $x_m$ comprises a peak amplitude of the transmit signal components $x_m$.

According to aspects, the determining S32 comprises determining S33 the shaping components $e_m$ as a vector which optimizes said performance metric of the transmit unit 220, 220a, 220b.

Figure 8:
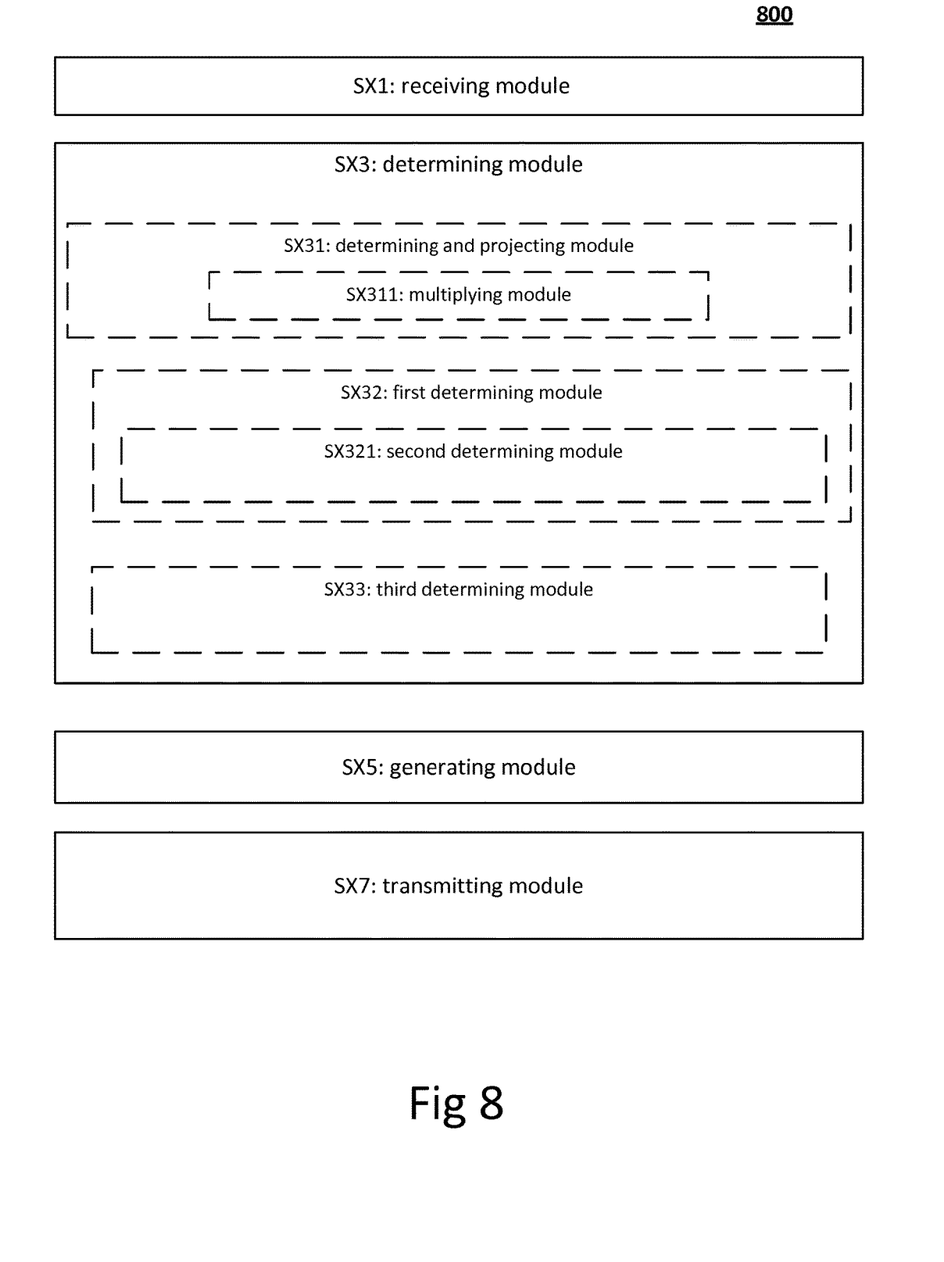
FIG. 8 is a block diagram illustrating a radio transmitter implementing methods according to some of the aspects presented herein.

FIG. 8 shows a transmitter 800 for radio transmission to one or more receivers 120, 120a over a channel described at least in part by a channel matrix H. The transmitter is configured to implement some of the methods described herein, and comprises a transmit unit 220, 220a, 220b connected to an antenna array 130, 130a, 230 having a number M of antenna elements $a_m$ (231), m=1, 2, ..., M, which transmit unit and antenna array are not specifically shown in FIG. 8, but was illustrated in, e.g., FIGS. 1-4. The transmitter 800 comprises;

a receiver module SX1 configured to receive a number K<M of data streams $s_k$, k=1, 2, ..., K;

a determining module SX3 configure to determine M shaping components $e_m$ based on a null-space of the channel matrix H and on one or more properties of the transmit unit 220, 220a, 220b;

a generating module SX5 configured to generate M transmit signal components $x_m$ from the K data streams, the generating comprising adding the M shaping components $e_m$, to respective transmit signal components $x_m$; and a transmitting module SX7 configured to transmit the M transmit signal components $x_m$ from respective antenna elements $a_m$.

According to some aspects, the determining module SX3 comprises a determining and projecting module SX31 configured to determine and to project the shaping components $e_m$ by projecting a shaping vectors 211 onto the null-space of the channel matrix H.

According to some aspects, the determining and projecting module SX31 comprises a multiplying module SX311 configured to multiply by an orthogonal projection matrix $P_H^\perp = I - H(H^H H)^{-1} H^H$, where I denotes the identity matrix, $(\cdot)^{-1}$ denotes matrix inverse, and $H^H$ denotes Hermitian transpose of the channel matrix H.

According to some aspects, the transmit unit 800 further comprises one or more digital to analog converters 221, 221a, DACs, not explicitly shown in FIG. 8, the distortion components $d_m$ comprising quantization errors due to said DACs 221, 221a, the determining module SX3 comprises a first determining module SX32 configured to determine the shaping components $e_m$ as independent dithering components generated based on a least significant bit, LSB, signal magnitude of the one or more DACs 221, 221a.

According to some aspects, the first determining module SX32 comprises a second determining module SX321 configured to determine the shaping components $e_m$ as a vector of independent identically distributed elements, statistically distributed essentially between −LSB/2 and LSB/2, and projected onto the null-space of the channel matrix H.

According to some aspects, the determining module SX3 comprises a third determining module SX33 configured to determine the shaping components $e_m$ as a vector which optimizes said performance metric of the transmit unit 220, 220a, 220b.

The various aspects of the methods described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A transmitter for radio transmission to one or more receivers over a channel described at least in part by a channel matrix H, the transmitter comprising:
   a pre-coder connected to an antenna array via a transmit unit;
   wherein the antenna array comprises a number M of antenna elements $a_m$, m=1, 2, ..., M, each antenna element $a_m$ being configured to receive a respective transmit signal component $x_m$ from the pre-coder via the transmit unit;
   wherein the pre-coder is configured to:
      receive a number K<M of data streams $s_k$, k=1, 2, ..., K; and
      generate the M transmit signal components by adding M shaping components $e_m$, m=1, 2, ..., M, to respective transmit signal components $x_m$; and
   wherein the shaping components $e_m$ are determined based on a null-space of the channel matrix H and on one or more properties of the transmit unit.

2. The transmitter of claim 1, wherein the shaping components $e_m$ are determined by projection of a shaping vector 6 onto the null-space of the channel matrix H.

3. The transmitter of claim 2, wherein the projection comprises multiplication by an orthogonal projection matrix $P_H^\perp = I - H(H^H H)^{-1} H^H$, where:

I denotes the identity matrix;
$(\cdot)^{-1}$ denotes matrix inverse; and
$H^H$ denotes Hermitian transpose of the channel matrix H.

4. The transmitter of claim 1, wherein the one or more properties of the transmit unit comprise addition of distortion components $d_m$ to the respective transmit signal components $x_m$, the distortion components $d_m$ being dependent on the shaping components $e_m$ of corresponding transmit signal components $x_m$.

5. The transmitter of claim 4, wherein:
   the transmit unit comprises one or more digital to analog converters (DACs);
   the distortion components $d_m$ comprise quantization errors due to the DACs;
   the shaping components $e_m$ comprise independent dithering components determined based on a least significant bit (LSB) signal magnitude of the one or more DACs; and
   the dithering components comprise a random signal for de-correlating parts of the transmit signal components.

6. The transmitter of claim 5, wherein the dithering components constitute a vector of independent identically distributed elements, statistically distributed between −LSB/2 and LSB/2, and projected onto the null-space of the channel matrix H.

7. The transmitter of claim 1, wherein:
   a performance metric of the transmit unit is dependent on one or more characteristics of the transmit signal components $x_m$; and
   the respective shaping components $e_m$ have an impact on the characteristics of the transmit signal components $x_m$.

8. The transmitter of claim 7, wherein:
   the performance metric of the transmit unit comprises a power efficiency of a power amplifier comprised in the transmit unit; and
   the one or more characteristics of the transmit signal components $x_m$ comprise a signal variance of the transmit signal components $x_m$.

9. The transmitter of claim 7:
   wherein the performance metric comprises a measure of non-linear distortion on the transmit signal components $x_m$ by the transmit unit; and
   wherein the one or more characteristics of the transmit signal components $x_m$ comprise a peak-to-average power ratio or a cubic metric of the transmit signal components $x_m$.

10. The transmitter of claim 7:
    wherein the performance metric comprises a dynamic range of the transmit unit or of a component comprised in the transmit unit; and
    wherein the one or more characteristics of the transmit signal components $x_m$ comprises a peak amplitude of the transmit signal components $x_m$.

11. A network node comprising:
    a transmitter for radio transmission to one or more receivers over a channel described at least in part by a channel matrix H, the transmitter comprising:
       a pre-coder connected to an antenna array via a transmit unit;
       wherein the antenna array comprises a number M of antenna elements $a_m$, m=1, 2, ..., M, each antenna element $a_m$ being configured to receive a respective transmit signal component $x_m$ from the pre-coder via the transmit unit;
       wherein the pre-coder is configured to:
          receive a number K<M of data streams $s_k$, k=1, 2, ..., K; and generate the M transmit signal components by adding M shaping components $e_m$, m=1, 2, ..., M, to respective transmit signal components $x_m$; and wherein the shaping components $e_m$ are determined based on a null-space of the channel matrix H and on one or more properties of the transmit unit.

12. A radar transceiver comprising:
a transmitter for radio transmission to one or more receivers over a channel described at least in part by a channel matrix H, the transmitter comprising:
a pre-coder connected to an antenna array via a transmit unit;
wherein the antenna array comprises a number M of antenna elements $a_m$, m=1, 2, ..., M, each antenna element $a_m$ being configured to receive a respective transmit signal component $x_m$ from the pre-coder via the transmit unit;
wherein the pre-coder is configured to:
receive a number K<M of data streams $s_k$, k=1, 2, ..., K; and
generate the M transmit signal components by adding M shaping components $e_m$, m=1, 2, ..., M, to respective transmit signal components $x_m$; and
wherein the shaping components $e_m$ are determined based on a null-space of the channel matrix H and on one or more properties of the transmit unit.

13. A method for radio transmission to one or more receivers over a channel described at least in part by a channel matrix H, performed in a transmitter comprising a transmit unit connected to an antenna array having a number M of antenna elements $a_m$, m=1, 2, ..., M, the method comprising:
receiving a number K<M of data streams $s_k$, k=1, 2, ..., K;
determining M shaping components $e_m$ based on a null-space of the channel matrix H and on one or more properties of the transmit unit;
generating M transmit signal components $x_m$ from the K data streams, the generating comprising adding the M shaping components $e_m$ to respective transmit signal components $x_m$; and
transmitting the M transmit signal components $x_m$ from respective antenna elements $a_m$.

14. The method of claim 13, wherein the determining comprises determining the shaping components $e_m$ by projecting a shaping vector $\varepsilon$ onto the null-space of the channel matrix H.

15. The method of claim 14, the projecting comprising multiplying by an orthogonal projection matrix $P_H^\perp = I - H(H^H H)^{-1} H^H$, where:
I denotes the identity matrix;
$(\bullet)^{-1}$ denotes matrix inverse; and
$H^H$ denotes Hermitian transpose of the channel matrix H.

16. The method of claim 13, wherein the one or more properties of the transmit unit comprise addition of distortion components $d_m$ to the respective transmit signal components $x_m$, the distortion components $d_m$ being dependent on the shaping components $e_m$ of corresponding the transmit signal components $x_m$.

17. The method of claim 16, wherein:
the transmit unit comprises one or more digital to analog converters (DACs);
the distortion components $d_m$ comprise quantization errors due to the DACs;
the determining comprises determining the shaping components $e_m$ as independent dithering components generated based on a least significant bit (LSB) signal magnitude of the one or more DACs;
the dithering components comprise a random signal for de-correlating parts of the transmit signal components.

18. The method of claim 17, wherein the determining comprises determining the shaping components $e_m$ as a vector of independent identically distributed elements, statistically distributed between $-LSB/2$ and $LSB/2$, and projected onto the null-space of the channel matrix H.

19. The method of claim 13, wherein:
a performance metric of the transmit unit is dependent on one or more characteristics of the transmit signal components $x_m$; and
the respective shaping components $e_m$ have an impact on the characteristics of the transmit signal components $x_m$.

20. The method of claim 19, wherein:
the performance metric of the transmit unit comprises a power efficiency of a power amplifier comprised in the transmit unit; and
the one or more characteristics of the transmit signal components $x_m$ comprise a signal variance of the transmit signal components $x_m$.

21. The method of claim 19, wherein:
the performance metric comprises a measure of non-linear distortion on the transmit signal components $x_m$ by the transmit unit; and
the one or more characteristics of the transmit signal components $x_m$ comprises a peak-to-average power ratio or a cubic metric of the transmit signal components $x_m$.

22. The method of claim 19, wherein:
the performance metric comprises a dynamic range of the transmit unit, or of a component comprised in the transmit unit; and
the one or more characteristics of the transmit signal components $x_m$ comprise a peak amplitude of the transmit signal components $x_m$.

23. The method of claim 13, wherein the determining comprises determining the shaping components $e_m$ as a vector which optimizes a performance metric of the transmit unit.

24. A non-transitory computer readable recording medium storing a computer program product for controlling a transmitter's radio transmission to one or more receivers over a channel described at least in part by a channel matrix H; the transmitter comprising a transmit unit connected to an antenna array having a number M of antenna elements $a_m$, m=1, 2, ..., M; the computer program product comprising software instructions which, when run on processing circuitry of the transmitter, causes the transmitter to:
receive a number K<M of data streams $s_k$, k=1, 2, ..., K;
determine M shaping components $e_m$ based on a null-space of the channel matrix H and on one or more properties of the transmit unit;
generate M transmit signal components $x_m$ from the K data streams, the generating comprising adding the M shaping components $e_m$ to respective transmit signal components $x_m$; and
transmit the M transmit signal components $x_m$ from respective antenna elements $a_m$.

* * * * *

UNITED STATES PATENT AND TRADEMARK OFFICE
CERTIFICATE OF CORRECTION

PATENT NO. : 10,218,421 B2
APPLICATION NO. : 15/518266
DATED : February 26, 2019
INVENTOR(S) : Gustavsson et al.

Page 1 of 1

It is certified that error appears in the above-identified patent and that said Letters Patent is hereby corrected as shown below:

In the Specification

In Column 6, Line 36, delete "dithering vector E" and insert -- dithering vector $\varepsilon$ --, therefor.

In Column 6, Line 48, delete "if E" and insert -- if $\varepsilon$ --, therefor.

In Column 9, Lines 64-65, delete "$P_H^\perp = I - H(H^H H)^-{}_1 H^H$," and insert -- $P_H^\perp = I - H(H^H H)^{-1} H^H$, --, therefor.

In Column 11, Line 47, delete "shaping vectors" and insert -- shaping vector $\varepsilon$ --, therefor.

In Column 12, Line 60, delete "shaping vectors 211" and insert -- shaping vector $\varepsilon$ 211 --, therefor.

In the Claims

In Column 13, Lines 63-64, in Claim 2, delete "shaping vector 6" and insert -- shaping vector $\varepsilon$ --, therefor.

Signed and Sealed this
Twentieth Day of August, 2019

Andrei Iancu
*Director of the United States Patent and Trademark Office*